United States Patent
Giannoccaro et al.

(10) Patent No.: US 9,246,327 B2
(45) Date of Patent: Jan. 26, 2016

(54) ARRANGEMENT FOR CONTROLLING THE ELECTRIC POWER TRANSMISSION IN A HVDC POWER TRANSMISSION SYSTEM

(75) Inventors: Dimitris Giannoccaro, Stockholm (SE); Soubhik Auddy, West Bengal (SE); Mats Hyttinen, Ludvika (SE); Mukherjee Subhasish, West Bengal (IN); Tomas Jonsson, Västerås (SE); Bopparaju Gopichand, Chennai (IN); Carl Heyman, Västerås (SE)

(73) Assignee: ABB Technology Ltd, Zürich (CH)

( * ) Notice: Subject to any disclaimer, the term of this patent is extended or adjusted under 35 U.S.C. 154(b) by 0 days.

(21) Appl. No.: 14/367,507

(22) PCT Filed: Dec. 21, 2011

(86) PCT No.: PCT/EP2011/073713
§ 371 (c)(1),
(2), (4) Date: Oct. 17, 2014

(87) PCT Pub. No.: WO2013/091700
PCT Pub. Date: Jun. 27, 2013

(65) Prior Publication Data
US 2015/0029621 A1 Jan. 29, 2015

(51) Int. Cl.
*H02H 7/00* (2006.01)
*H02H 9/02* (2006.01)
(Continued)

(52) U.S. Cl.
CPC .............. *H02H 9/025* (2013.01); *H02H 9/04* (2013.01); *H02J 3/36* (2013.01); *Y02E 60/60* (2013.01)

(58) Field of Classification Search
USPC ................................................ 361/8, 16, 54
See application file for complete search history.

(56) References Cited

U.S. PATENT DOCUMENTS 3,694,728 A * 9/1972 Kanngiesser et al. .......... 363/51
5,164,872 A * 11/1992 Howell ............................ 361/3
(Continued)

FOREIGN PATENT DOCUMENTS

DE 1 513 827 A1 9/1969
WO WO 2012/037964 A1 3/2012

*Primary Examiner* — Ronald W Leja
(74) *Attorney, Agent, or Firm* — Birch, Stewart, Kolasch & Birch, LLP

(57) ABSTRACT

An arrangement for controlling the electric power transmission in a high voltage direct current, HVDC, power transmission system includes at least one HVDC transmission or distribution line for carrying direct current, DC, and the arrangement includes an apparatus connectable to the HVDC transmission or distribution line, the apparatus being arranged to control the direct current of the HVDC transmission or distribution line by introducing a DC voltage in series with the HVDC transmission or distribution line. The arrangement includes a protection device for protecting the apparatus against over-current or overvoltage occurrences. The protection device includes a bypass device connectable to the HVDC transmission or distribution line and connected in parallel with the apparatus. The bypass device is arranged to be in a non-conducting mode and arranged to be set to a conducting mode. When being in the conducting mode, the bypass device is arranged to conduct direct current of the HVDC transmission or distribution line to electrically bypass the apparatus. A HVDC power transmission system includes at least one arrangement of the above-mentioned sort. A method for protecting an apparatus against over-current or overvoltage occurrences, the apparatus being included in an arrangement of the above-mentioned sort.

25 Claims, 8 Drawing Sheets

(51) Int. Cl.
*H02J 3/36* (2006.01)
*H02H 9/04* (2006.01)

(56) References Cited

U.S. PATENT DOCUMENTS

| | | | | |
|---|---|---|---|---|
| 5,339,210 A | * | 8/1994 | Howell | 361/9 |
| 5,420,495 A | * | 5/1995 | Hingorani | 323/218 |
| 5,517,378 A | * | 5/1996 | Asplund et al. | 361/4 |
| 7,508,636 B2 | * | 3/2009 | Sellier et al. | 361/8 |
| 2007/0139975 A1 | * | 6/2007 | Yamauchi | B60L 11/1868 363/16 |
| 2010/0254046 A1 | * | 10/2010 | Liu et al. | 361/8 |
| 2012/0026760 A1 | * | 2/2012 | Juhlin | 363/35 |
| 2012/0033462 A1 | * | 2/2012 | Juhlin | 363/35 |
| 2013/0016541 A1 | * | 1/2013 | Norrga et al. | 363/52 |
| 2013/0170255 A1 | * | 7/2013 | Mukherjee | H02J 3/36 363/35 |
| 2013/0208514 A1 | * | 8/2013 | Trainer et al. | 363/35 |
| 2015/0029621 A1 | * | 1/2015 | Giannoccaro | H02J 3/36 361/54 |

* cited by examiner

ARRANGEMENT FOR CONTROLLING THE ELECTRIC POWER TRANSMISSION IN A HVDC POWER TRANSMISSION SYSTEM

TECHNICAL FIELD

The present invention relates to an arrangement for controlling the electric power transmission in a high voltage direct current, HVDC, power transmission system comprising at least one HVDC transmission or distribution line for carrying direct current, DC. The arrangement comprises an apparatus connectable to the HVDC transmission or distribution line, the apparatus being arranged to control the direct current of the HVDC transmission or distribution line by introducing a DC voltage in series with the HVDC transmission or distribution line. Further, the present invention relates to a HVDC power transmission system comprising at least one HVDC transmission or distribution line for carrying direct current, and a plurality of converter stations connected to the at least one HVDC transmission or distribution line, each of the converter stations being arranged to convert alternating current, AC, to direct current for input to the at least one HVDC transmission or distribution line, and/or direct current to alternating current, wherein the system comprises at least one arrangement of the above-mentioned sort. The present invention also relates to a method for protecting an apparatus against over-current or overvoltage occurrences, the apparatus being included in an arrangement of the above-mentioned sort.

BACKGROUND OF THE INVENTION

A HVDC power distribution network or a HVDC power transmission system uses direct current for the transmission of electrical power, in contrast to the more common AC systems. For long-distance transmission or distribution, HVDC systems may be less expensive and may suffer lower electrical losses. In general, a HVDC power transmission system comprises at least one long-distance HVDC link or cable for carrying direct current a long distance, e.g. under sea, and converter stations for converting alternating current to direct current for input to the HVDC power transmission system and converter stations for converting direct current back to alternating current.

U.S. Pat. No. 6,788,033 and U.S. Pat. No. 5,734,258 disclose DC to DC conversion and relate to stationary or portable systems powered by a DC battery, and to electric vehicles. U.S. Pat. No. 6,914,420 describes a power converter for converting power between a first and a second voltage, and relates to electric vehicles.

U.S. Pat. No. 7,518,266 discloses an AC power transmission system, where a DC transmission ring is used, utilizing controllable AC-DC converters in a multi-in-feed/out-feed arrangement.

U.S. Pat. No. 3,694,728 describes a HVDC mesh-operated network comprising several interconnected stations for effecting an exchange of power by means of converters located at the stations and which are connected to AC networks.

DE 2530789 discloses an arrangement for protecting a converter connected to a DC line, the arrangement comprising a surge arrester connected in series with a non-linear resistor.

U.S. Pat. No. 3,694,728 describes a circuit arrangement for altering current distribution in mesh-operated HVDC transmission networks.

JP2000-175361 discloses an alternating current direct current hybrid power transmission system.

WO 2007/022744 describes a current-limiting switch, which may be connected to a DC network, including a mechanical switching unit, a power-electronic switching unit, a capacitive short-circuit limitation unit and a varistor.

WO 2011/095624 discloses a circuit for connecting and disconnecting an energizable electric system and an electric network of a vehicle, the circuit comprising a mechanical circuit breaker and a semiconductor switch.

WO 2011/124258 describes a power electronic converter for use in HVDC power transmission.

DE 1513827 discloses an apparatus for influencing the current distribution in a HVDC network.

The Object of the Invention

To control the electric power transmission in a HVDC power transmission system comprising at least one HVDC line and a plurality of converter stations for converting between alternating current and direct current in order to avoid or reduce DC load-flow congestion in the system, each of the converter stations may be controlled, e.g. by controlling the DC node voltage of each converter station. However, the inventors of the present invention have found that the DC node voltage control of the converter stations, or the control of shunt connected converter DC voltages of a DC grid, may not be sufficient in order to avoid or reduce load-flow congestion of the system.

The object of the present invention is to improve the electric power transmission in a HVDC power transmission system. It is also an object of the present invention to provide an improved control of the electric power transmission in a HVDC power transmission system. A further object of the present invention is to avoid, reduce or prevent load-flow congestion in the system. Another object of the present invention is to provide an improved HVDC power transmission system.

SUMMARY OF THE INVENTION

The above-mentioned objects of the present invention are attained by providing an arrangement for controlling the electric power transmission in a high voltage direct current, HVDC, power transmission system comprising at least one HVDC transmission or distribution line for carrying direct current, DC, and the arrangement comprises an apparatus connectable to the HVDC transmission or distribution line, the apparatus being arranged to control the direct current of the HVDC transmission or distribution line by introducing a DC voltage in series with the HVDC transmission or distribution line, wherein the arrangement comprises a protection device for protecting the apparatus against over-current or overvoltage occurrences, wherein the protection device comprises a bypass device connectable to the HVDC transmission or distribution line and connected in parallel with the apparatus, wherein the bypass device is arranged to be in a non-conducting mode, wherein the bypass device is arranged to be set to a conducting mode, and wherein when being in the conducting mode the bypass device is arranged to conduct direct current of the HVDC transmission or distribution line to electrically bypass the apparatus.

By means of the innovative arrangement of the present invention, the electric power transmission in a HVDC power transmission system and the control thereof are efficiently improved, and load-flow congestion in the system may be avoided, reduced or prevented. Further, by means of the protection device of the arrangement, the apparatus is efficiently protected against over-currents and/or overvoltage without interrupting the power transmission in the HVDC transmission or distribution line. By means of the protection device of the arrangement, which comprises the bypass device, damages to the apparatus are efficiently avoided. By means of the protection device of the arrangement, after a fault occurrence the apparatus can also be reinserted in the HVDC transmission or distribution line in efficient manner.

When being in the conducting mode, the bypass device may be arranged to electrically bypass the apparatus for protecting the apparatus against over-current or overvoltage occurrences. When being in the conducting mode, the bypass device may be arranged to electrically bypass the apparatus for zero voltage insertion of the apparatus in the HVDC transmission or distribution line.

The arrangement of the present invention is especially advantageous and efficient for a HVDC power transmission system of the sort shown in FIG. 1, which may be called a DC grid concept, where the system comprises several HVDC transmission or distribution lines for carrying direct current and several converter stations connected to the HVDC transmission lines. The arrangement's apparatus is especially advantageous when the control of DC node voltage of the converter stations, or the control of shunt connected converter DC voltages of a DC grid, is not sufficient. By means of the apparatus of the arrangement according to the present invention, the direct current of the HVDC transmission line, to which the apparatus is connected, can be increased or reduced in order to control the power transmission. The direct current control is attained by the apparatus' introduction, or injection, of a DC voltage in series with the HVDC transmission line. The injected DC voltage produces a fictive resistance, $\Delta R_{inj}$. The fictive resistance provides an active power extraction or output from the HVDC transmission line when the fictive resistance corresponds to an increase in resistance, i.e. a positive $\Delta R_{inj}$, (since a resistance consumes power/energy), or an active power input to the HVDC transmission line when the fictive resistance corresponds to a decrease in resistance, i.e. a negative $\Delta R_{inj}$. A positive $\Delta R_{inj}$ is produced when the apparatus introduces a positive DC voltage in series with the HVDC transmission line, and a negative $\Delta R_{inj}$ is produced when the apparatus introduces a negative DC voltage in series with the HVDC transmission line. Thus, by means of the arrangement of the present invention, the load of the HVDC transmission line, to which the arrangement is connected, may be reduced or increased. The apparatus' active power extraction or output from the HVDC transmission line results in a decrease in direct current of the line, and the apparatus' active power input to the HVDC transmission line results in an increase in direct current of the line. By the increase and decrease in direct current of HVDC transmission line, the power transmission is controlled and load-flow congestion may be avoided, reduced or prevented. Thus, the apparatus of the arrangement according to the present invention is arranged to regulate the voltage at its output to control the current flow in the HVDC transmission line.

In alternative words, the apparatus of the arrangement according to the present invention is arranged to control the direct current of the HVDC transmission line by introducing a fictive resistance in series with the HVDC transmission line by introducing a DC voltage in series with the HVDC transmission line.

Further, the direct current in a HVDC power transmission system, e.g. a DC grid system, may reverse, and therefore, voltage polarity reversal for maintained fictive resistance is required, which may also be attained by means of the apparatus of the arrangement according to the present invention.

The various components of the arrangement according to the present invention, which are connected or connectable to one another or to other units, may be electrically connected, or connectable, to one another or to other units, e.g. via electrical conductors, e.g. busbars or DC lines, and/or may be indirectly connected, or connectable, e.g. electrically or inductively, via additional intermediate electric equipment or units located and connected/connectable between the components, e.g. a transformer, another converter etc.

In general, High Voltage may be about 1-1.5 kV and above. However, for HVDC applications and systems, High Voltage may be about 100 kV and above, e.g. 150 kV, 320 kV, 500 kV, 800 kV or 1000 kV, and above. The arrangement and/or the system according to the present invention are advantageously adapted for the above-mentioned HVDC voltage levels and above. The voltage rating of the apparatus may be 1-5% of the HVDC transmission line voltage.

The bypass device may be arranged to be set from the non-conducting mode to the conducting mode. The bypass device may be arranged to be set between the non-conducting mode and the conducting mode.

The protection device of the arrangement may comprise detection means, e.g. a detector, for detecting over-current and/or overvoltage occurrences in the HVDC power transmission system, in the HVDC transmission or distribution line and/or in the apparatus. The detection means may be arranged to detect over-currents and/or overvoltage in the HVDC power transmission system, in the HVDC transmission or distribution line and/or in the apparatus. The detection means may be in the form of a conventional detection unit or equipment known to the skilled person.

According to an advantageous embodiment of the arrangement according to the present invention, the bypass device comprises at least one switch switchable between a non-conducting mode and a conducting mode, and when being in the conducting mode the at least one switch is arranged to conduct direct current of the HVDC transmission or distribution line to electrically bypass the apparatus for protecting the apparatus against over-current or overvoltage occurrences. Alternatively, the bypass device may comprise a plasma switch, or a forced triggered spark gap. The forced triggered spark gap may be included in a plasma switch.

A switch may have at least two positions, modes or states comprising a conducting mode and a non-conducting mode. In the conducting mode, which may be a closed position, the switch conducts current. In the non-conducting mode, which may be an open position, the switch breaks/interrupts the current path and the switch is substantially non-conductive and does not conduct any current.

The bypass device may be arranged to be in the non-conducting mode when no over-current occurrence is detected and may be arranged to be set to the conducting mode when an over-current occurrence is detected to electrically bypass the apparatus. The bypass device may be arranged to be in the non-conducting mode when no overvoltage occurrence is detected and may be arranged to be set to the conducting mode when an overvoltage occurrence is detected to electrically bypass the apparatus.

The at least one switch may be arranged to be in the non-conducting mode when no over-current occurrence is detected and may be arranged to be set to the conducting mode when an over-current occurrence is detected to electrically bypass the apparatus. The at least one switch may be arranged to be in the non-conducting mode when no overvoltage occurrence is detected and may be arranged to be set to the conducting mode when an overvoltage occurrence is detected to electrically bypass the apparatus.

The detection means may comprise measuring means for measuring the current and/or voltage of the HVDC transmission or distribution line and/or of the apparatus. The measuring means may be in the form of a conventional measuring unit or measuring equipment known to the skilled person, e.g. at least one current sensor and/or at least one voltage sensor.

The protection device may comprise control equipment for controlling the bypass device. The protection device may comprise control equipment for controlling the at least one switch. The control equipment may be connected to the detection means. The control equipment may be arranged to set the bypass device to the conducting mode, when an over-current or overvoltage occurrence is detected. The control equipment may be arranged to set the at least one switch to the conducting mode, when an over-current or overvoltage occurrence is detected. The control equipment may include suitable processing means, e.g. a CPU. Further, the control equipment may be arranged to set the bypass device to the non-conducting mode. The control equipment may be arranged to set the at least one switch to the non-conducting mode.

According to another advantageous embodiment of the arrangement according to the present invention, the arrangement comprises control means for controlling the apparatus, wherein the control means are arranged to control the apparatus to introduce a positive DC voltage in series with the HVDC transmission or distribution line for reducing the direct current of the HVDC transmission or distribution line, and wherein the control means are arranged to control the apparatus to introduce a negative DC voltage in series with the HVDC transmission or distribution line for increasing the direct current of the HVDC transmission or distribution line. By means of the control means of this embodiment, the current flow in the HVDC transmission line is efficiently controlled. The control means may be in form of a control unit and may be connectable to the HVDC power transmission system, e.g. to the HVDC transmission line. The control means may comprise a computer and/or a CPU. In alternative words, the control means may be arranged to control the apparatus to introduce a positive fictive resistance in series with the HVDC transmission line by introducing a positive DC voltage in series with the HVDC transmission line for reducing the direct current of the HVDC transmission line, and the control means may be arranged to control the apparatus to introduce a negative fictive resistance in series with the HVDC transmission line by introducing a negative DC voltage in series with the HVDC transmission line for increasing the direct current of the HVDC transmission line.

According to a further advantageous embodiment of the arrangement according to the present invention, the arrangement comprises DC load flow congestion measuring means for measuring the DC load flow congestion of the HVDC power transmission system, and the DC load flow congestion measuring means may be arranged to communicate with the control means. The DC load flow congestion measuring means may be connected to the control means. The DC load flow congestion measuring means may be arranged to measure the direct current or direct voltage of the HVDC line, and the DC load flow congestion measuring means per se may have a structure known to the person skilled in the art. The DC load flow congestion measuring means, or DC load flow congestion measuring equipment, may comprise conventional sensors, e.g. sensors for measuring direct current or voltage.

According to another advantageous embodiment of the arrangement according to the present invention, the at least one switch comprises a high speed switch. By means of this embodiment, the electric power transmission in a HVDC power transmission system and the control thereof are efficiently improved, and the apparatus is efficiently protected against over-currents and/or overvoltage while ensuring the power transmission in the HVDC transmission or distribution line, without any interruption. A high speed switch may be a switch that is arranged to switch to the conducting mode within 4 ms.

According to still another advantageous embodiment of the arrangement according to the present invention, the bypass device comprises a first bypass unit comprising a first switch and a second switch connected in series with the first switch, each of the first and second switches being switchable between a non-conducting mode and a conducting mode, and the first switch comprises a mechanical switch and the second switch comprises at least one electronic switch. By means of the second switch, the first switch may be efficiently set to the non-conducting mode when the apparatus is to be reinserted in the HDCV transmission or distribution line, after a fault case or after maintenance work. By means of this embodiment, the electric power transmission in a HVDC power transmission system and the control thereof are improved, and the apparatus is efficiently protected against over-currents and/or overvoltage while maintaining power transmission in the HVDC transmission or distribution line. The second switch may be arranged to switch to the conducting mode before the first switch is switched to the conducting mode.

Advantageously, the at least one electronic switch of the second switch may comprise at last one power semiconductor switch. Advantageously, the first switch may be a high speed mechanical switch. By means of these two embodiments, the electric power transmission in a HVDC power transmission system and the control thereof are improved, and the apparatus is efficiently protected against over-currents and/or overvoltage while maintaining power transmission in the HVDC transmission or distribution line. A high speed mechanical switch may be a mechanical switch that is arranged to switch to the conducting mode within 5 ms, or even within 4 ms.

According to an advantageous embodiment of the arrangement according to the present invention, the bypass device comprises a second bypass unit connected in parallel with the first bypass unit, and in that the second bypass unit comprises at least one high speed switch. Advantageously, the at least one high speed switch of the second bypass unit may be arranged to switch to its conducting mode within a closing time period shorter than the closing time period of any of the first and second switches. Consequently, upon over-currents, current may quickly be diverted from the apparatus to the second bypass unit before the first and second switches of the first bypass unit are set to the conducting mode, and the stress on the apparatus is quickly reduced. By means of these embodiments, a switch, which is very fast but not configured to carry current for a long time, may be used in parallel with the first bypass unit, which may comprise switches configured to carry current for a longer time. Consequently, a fast protection of the apparatus is provided while the power transmission in the HVDC transmission or distribution line is ensured for a long period of time.

According to a further advantageous embodiment of the arrangement according to the present invention, the second bypass unit may comprise a third switch and a fourth switch connected in parallel with the third switch, each of the third and fourth switches being switchable between a non-conducting mode and a conducting mode, the third switch may comprise a mechanical switch and the fourth switch may comprise a plasma switch. Advantageously, the third switch may comprise a high speed mechanical switch. Advantageously, the fourth switch may be arranged to switch to its conducting mode within a closing time period shorter than the closing time period of any of the first and second switches. By means of these embodiments, a fast protection of the apparatus is provided while the power transmission in the HVDC transmission or distribution line is ensured for a long period of time.

According to another advantageous embodiment of the arrangement according to the present invention, the protection device comprises a voltage-dependent nonlinear resistor connected in parallel with the apparatus. The voltage-dependent nonlinear resistor may comprise a surge arrester. By means of these embodiments, the electric power transmission in a HVDC power transmission system and the control thereof are improved, and the protection of the apparatus against over-currents and/or overvoltage is further improved. A voltage-dependent nonlinear resistor is a device which has a voltage-dependent nonlinear resistance. In general, a voltage-dependent nonlinear resistor conducts a very low current, but when the voltage across the voltage-dependent nonlinear resistor exceeds a certain level it will conduct a substantially increased current. The threshold or clamping voltage, of each voltage-dependent nonlinear resistor may be adapted to specific applications. Upon overvoltage across the apparatus and across the voltage-dependent nonlinear resistor, current may quickly be diverted from the apparatus to the conducting voltage-dependent nonlinear resistor before the at least one switch of the bypass device is set to the conducting mode, and the stress on the apparatus is quickly reduced.

According to still another advantageous embodiment of the arrangement according to the present invention, the apparatus comprises at least one first converter for converting alternating current, AC, to direct current and/or direct current to alternating current, the at least one first converter having an AC side for output and/or input of alternating current and a DC side for output and/or input of direct current. By means of this embodiment, the electric power transmission in a HVDC power transmission system and the control thereof are efficiently improved. The first converter may comprise at last one power semiconductor switch or a plurality of power semiconductor switches. The at least first one first converter may comprise a plurality of power semiconductor switches.

According to yet another advantageous embodiment of the arrangement according to the present invention, the at least first one first converter comprises a Voltage Source Converter, VSC. By means of this embodiment, the electric power transmission in a HVDC power transmission system and the control thereof are further improved.

According to an advantageous embodiment of the arrangement according to the present invention, the at least one first converter comprises a Line Commutated Converter, LCC. By means of this embodiment, the electric power transmission in a HVDC power transmission system and the control thereof are further improved.

According to a further advantageous embodiment of the arrangement according to the present invention, where the at least one first converter comprises a Line Commutated Converter, LCC, the protection device comprises a fifth switch connectable in series with the HVDC transmission or distribution line, the fifth switch being switchable between a non-conducting mode and a conducting mode, wherein the arrangement comprises a series connection of the apparatus and of the fifth switch, the fifth switch comprising at least one electronic switch, and the bypass device is connected in parallel with said series connection. By means of this embodiment, the electric power transmission in a HVDC power transmission system and the control thereof are improved, and the protection of the apparatus against over-currents and/or overvoltage is further improved. The at least one electronic switch of the fifth switch may comprise at last one power semiconductor switch.

According to another advantageous embodiment of the arrangement according to the present invention, the apparatus is connectable to a DC source or an AC source. By means of this embodiment, the electric power transmission in a HVDC power transmission system and the control thereof are further improved. To effect or introduce a positive fictive resistance, $+\Delta R_{inj}$, active power should be absorbed by the DC or AC source, and to effect or introduce a negative fictive resistance, $-\Delta R_{inj}$, active power should be injected by and from the DC or AC source. Examples of the DC source and the AC source are given in the detailed description of preferred embodiments. The apparatus may comprise the DC source or the AC source.

According to an advantageous embodiment of the arrangement according to the present invention, the apparatus comprises an electric power transformer.

According to a further advantageous embodiment of the arrangement according to the present invention, the at least one first converter is connectable via its DC side to the HVDC transmission or distribution line.

According to another advantageous embodiment of the arrangement according to the present invention, the at least one first converter is connectable in series with the HVDC transmission or distribution line.

According to advantageous embodiments of the arrangement according to the present invention, each power semiconductor switch may comprise an Insulated Gate Bipolar Transistor, IGBT, or a Bi-Mode Insulated Gate Transistor, BiGT, or any other suitable power semiconductor switch. Alternatively, each power semiconductor switch may comprise a thyristor, e.g. a gate turn-off thyristor, GTO, an Integrated Gate-Commutated Thyristor, IGCT, or a Forced Commutated Thyristor. However, other suitable thyristors may also be used.

The above-mentioned objects of the present invention are also attained by providing a high voltage direct current, HVDC, power transmission system comprising at least one HVDC transmission or distribution line for carrying direct current, DC, and a plurality of converter stations connected to the at least one HVDC transmission or distribution line, each of the converter stations being arranged to convert alternating current, AC, to direct current for input to the at least one HVDC transmission or distribution line, and/or direct current to alternating current, wherein the system comprises at least one arrangement as claimed in any of the claims 1-21 for controlling the electric power transmission in the system, and/or at least one arrangement according to any of the above-mentioned embodiments of the arrangement. Positive technical effects of the HVDC power transmission system according to the present invention, and its embodiments, correspond to the above-mentioned technical effects mentioned in connection with the arrangement according to the present invention, and its embodiments. The at least one HVDC transmission line may be one or a plurality of HVDC transmission lines According to an advantageous embodiment of the HVDC power transmission system according to the present invention, the system comprises a plurality of HVDC transmission or distribution lines.

A plurality of HVDC transmission or distribution lines or converter stations may be two or more HVDC transmission or distribution lines or converter stations, respectively. The at least one arrangement may be one or a plurality of arrangements, e.g. two or more arrangements. A plurality of arrangements may be connected to the same HVDC transmission or distribution line, or to different HVDC transmission or distribution lines.

According to a further advantageous embodiment of the HVDC power transmission system according to the present invention, the system comprises at least three converter stations, or at least four converter stations. The system may comprise at least five converter stations.

According to another advantageous embodiment of the HVDC power transmission system according to the present invention, the at least one HVDC transmission or distribution line comprises at least one long-distance HVDC link. Advantageously, the HVDC transmission or distribution lines may comprise at least two long-distance HVDC links or cables.

The above-mentioned features and embodiments of the arrangement and the HVDC power transmission system, respectively, may be combined in various possible ways providing further advantageous embodiments.

The above-mentioned objects of the present invention are also attained by providing a method for protecting an apparatus against over-current or overvoltage occurrences, the apparatus being included in an arrangement as claimed in any of the claims 1 to 21, and/or an arrangement according to any of the above-mentioned embodiments of the arrangement, for controlling the direct current of the HVDC transmission or distribution line by introducing a DC voltage in series with the HVDC transmission or distribution line, wherein the method comprises the steps of detecting an over-current or overvoltage occurrence; and electrically bypassing the apparatus when an over-current or overvoltage occurrence is detected.

Further advantageous embodiments of the arrangement and the HVDC power transmission system, respectively, according to the present invention and further advantages with the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Abbreviations

Figure 1:
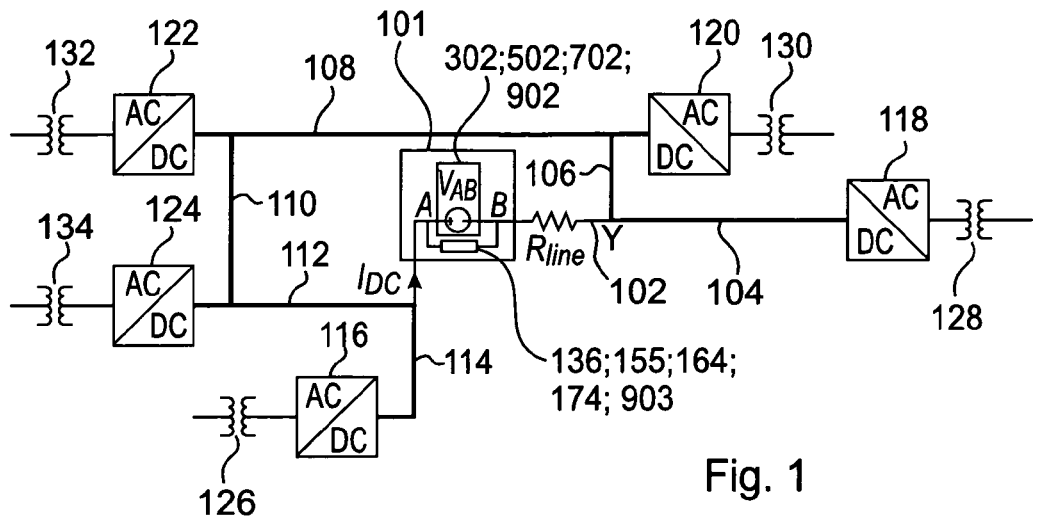
FIG. 1 is a schematic block diagram illustrating aspects of the HVDC power transmission system and aspects of the arrangement according to the present invention.

Alternating Current AC
Bi-Mode Insulated Gate Transistor BiGT
Direct Current DC
Central Processing Unit CPU
Gate Turn-Off thyristor GTO
High Voltage Direct Current HVDC
Insulated Gate Bipolar Transistor IGBT
Integrated Gate-Commutated Thyristor IGCT
Line Commutated Converter LCC
Voltage Source Converter VSC FIG. 1 schematically illustrates aspects of the HVDC power transmission system and aspects of the arrangement 101 for controlling the electric power transmission in the HVDC power transmission system according to the present invention. Although only the reference sign 101 is used for the different embodiments of the arrangement, it is to be understood that the arrangement 101 may have various different structures and designs within the scope of the appended claims, e.g. as is illustrated hereinafter. The HVDC power transmission system comprises at least one HVDC transmission or distribution line for carrying direct current, hereinafter called HVDC line, e.g. a plurality of HVDC lines 102, 104, 106, 108, 110, 112, 114. The HVDC lines may e.g. comprise HVDC cables, busbars, or other DC conductors. The HVDC lines 102, 104, 106, 108, 110, 112, 114 may comprise at least one long-distance HVDC link. In FIG. 1, a first and second long-distance HVDC links 102, 108 are provided. HVDC lines and links are well known to the skilled person and thus not discussed in further detail. The HVDC power transmission system comprises a plurality of converter stations 116, 118, 120, 122, 124 electrically connected to the HVDC lines 102, 104, 106, 108, 110, 112, 114. In FIG. 1, five converter stations 116, 118, 120, 122, 124 are provided, but there may be more or fewer converter stations. The HVDC power transmission system may e.g. comprise two, at least three, or at least four converter stations. Each of the converter stations 116, 118, 120, 122, 124 may be arranged to convert alternating current to direct current for input to the HVDC lines 102, 104, 106, 108, 110, 112, 114 and convert direct current to alternating current for input to neighbouring AC systems. Each converter station 116, 118, 120, 122, 124 may be electrically connected to a conventional electric power transformer 126, 128, 130, 132, 134 in conventional ways known to the skilled person. Electric power trans-formers and their function are well known to the person skilled in the art and therefore not discussed in more detail.

Figure 2A:
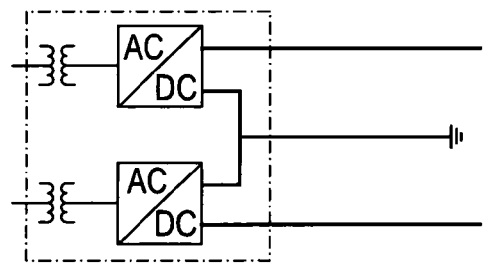
FIG. 2A is a schematic block diagram illustrating a first embodiment of a converter station shown in FIG. 1.
Figure 2B:
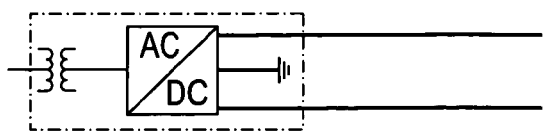
FIG. 2B is a schematic block diagram illustrating a second embodiment of a converter station shown in FIG. 1.

Each converter station 116, 118, 120, 122, 124, which may be called a DC Grid converter station, may have asymmetrical monopoles with separate converters for positive and negative polarity, as illustrated in FIG. 2A. Alternatively, each converter station 116, 118, 120, 122, 124 may be in the form of a balanced bipolar converter, as illustrated in FIG. 2B. The alternatives of FIGS. 2A and 2B may also be combined in the same system.

With reference to FIG. 1, the arrangement 101 of the present invention comprises an apparatus 302; 502; 702; 902 connectable to a HVDC line 102. The apparatus 302; 502; 702; 902 is arranged to control the direct current of the HVDC line 102 by introducing a DC voltage in series with the HVDC line 102. The apparatus 302; 502; 702; 902 may be connected between positions A and B as illustrated in FIG. 1. However, other locations and connections points are possible, and the apparatus 302; 502; 702; 902 may e.g. be connected to any of the other HVDC lines 104, 106, 108, 110, 112, 114. Consequently, also the arrangement 101 may be located at locations other than the position illustrated in FIG. 1. Several embodiments of the apparatus 302, 502, 702 are described in more detail in connection with FIGS. 10-15.

With reference to FIG. 1, the arrangement 101 of the present invention comprises a protection device 136; 155; 159; 164; 174; 903 for protecting the apparatus 302; 502; 702; 902 against over-current or overvoltage occurrences. The protection device 136; 155; 164; 174; 903 comprises a bypass device 138; 153; 161; 172 connectable to the HVDC line 102 and connected in parallel with the apparatus 302; 502; 702; 902.

The bypass device 138; 153; 161; 172 is arranged to be in a non-conducting mode, and the bypass device 138; 153; 161; 172 is arranged to be set to a conducting mode. When being in the conducting mode, the bypass device 138; 153; 161; 172 is arranged to conduct direct current of the HVDC line 102 to electrically bypass the apparatus 302; 502; 702; 902. When being in the conducting mode, the bypass device 138; 153; 161; 172 may be arranged to electrically bypass the apparatus 302; 502; 702; 902 for protecting the apparatus 302; 502; 702; 902 against over-current or overvoltage occurrences, and/or for zero voltage insertion of the apparatus 302; 502; 702; 902 in the HVDC line 102.

The bypass device 138; 153; 161; 172 may comprise at least one switch switchable between a non-conducting mode and a conducting mode, and when being in the conducting mode the at least one switch is arranged to conduct direct current of the HVDC line 102 to electrically bypass the apparatus 302; 502; 702; 902 for protecting the apparatus 302; 502; 702; 902 against over-current or overvoltage occurrences. The at least one switch may comprise a high speed switch, which may switch to the conducting mode within 5 ms, or even within 4 ms.

$R_{line}$ of the HVDC line 102 of FIG. 1 illustrates the resistance of the HVDC line 102, and $I_{DC}$ in FIG. 1 is the direct current through the HVDC line 102, i.e. the direct current carried by the HVDC line 102. The HVDC power transmission system may be adapted for single phase power or multi-phase power, e.g. three-phase power, and the components of the system and the arrangement may be configured accordingly in ways known to the skilled person.

The HVDC power transmission system comprises at least one of the embodiments of the arrangement 101 for controlling the electric power transmission in the system according to the present invention. The HVDC power transmission system may comprises a plurality of embodiments of the arrangement 101. Aspects of the arrangement 101 will hereinafter be disclosed.

Figure 3:
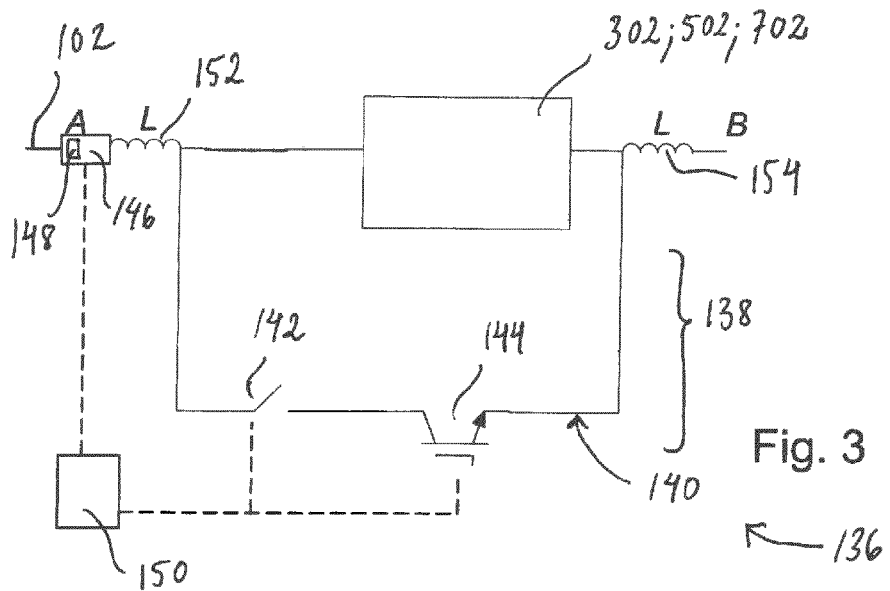
FIG. 3 is a schematic block diagram illustrating a first embodiment of the arrangement according to the present invention.

With reference to FIG. 3, a first embodiment of the arrangement according to the present invention is schematically illustrated. The arrangement comprises a protection device 136 for protecting the apparatus 302; 502; 702 against over-current or overvoltage occurrences. The protection device 136 comprises a bypass device 138 connectable to the HVDC line 102 and connected in parallel with the apparatus 302; 502; 702. The bypass device 138 may comprise a first bypass unit 140 comprising a first switch 142 and a second switch 144, the second switch 144 being connected in series with the first switch 142. Each of the first and second switches 142, 144 is switchable between a non-conducting mode and a conducting mode. The first switch 142 may comprise a mechanical switch and the second switch 144 may comprise at least one electronic switch. The at least one electronic switch of the second switch 144 may comprise at last one power semiconductor switch. The first switch 142 may be a high speed mechanical switch. A high speed mechanical switch may be a mechanical switch that is arranged to switch to the conducting mode within 5 ms, or even within 4 ms. Alternatively, the bypass device may comprise a single switch, e.g. one of the first and second switches 142, 144, whereas the other may be excluded.

Advantageously, when it is required to reinsert an apparatus 302; 502; 702 in the HVDC line 102, e.g. after a fault occurrence or after maintenance work, the bypass device 138 may comprise the first bypass unit 140 comprising the first switch 142 and the second switch 144. When the apparatus 302; 502; 702 is to be reinserted in the HDCV line 102, the apparatus 302, 502, 702 is already in a bypassed position where the first and second switches 142, 144 of the first bypass unit 140 are in the conducting mode and carry the current. When inserting the apparatus 302; 502; 702 in the HVDC line 102 and in order to make the current flow through the apparatus 302; 502; 702, the current of the bypass device 138 should be broken or interrupted. The current of the bypass device 138 may be interrupted by setting the second switch 144, which may comprise at least one electronic switch, to the non-conducting mode, resulting in zero current through the first switch 142, and then the first switch 142, which may be a mechanical switch, is set to the non-conducting mode.

Alternatively, the apparatus 302; 502; 702 may itself be switched to produce negative voltage, or less voltage in relation to the voltage drop across the bypass device 138, so that the apparatus 302; 502; 702 starts receiving current, and then the first switch 142, which may be a mechanical switch, may be set to the non-conducting mode. In alternative words, the apparatus 302; 502; 702 may be arranged to produce, or give, an alternating current and provide current zero crossing in the bypass device 138, so that the first switch 142, which may be a mechanical switch, may be set to the non-conducting mode. Thus, the second switch 144 may be excluded.

When the first and second switches 142, 144 are in the conducting mode they are arranged to conduct direct current of the HVDC line 102 to electrically bypass the apparatus 302; 502; 702 for protecting the apparatus 302; 502; 702 against over-current or overvoltage occurrences. The protection device 136 may comprise detection means 146, e.g. a detector, for detecting over-current and/or overvoltage occurrences in the HVDC power transmission system, in the HVDC line 102 and/or in the apparatus 302; 502; 702. The detection means 146 may be arranged to detect over-currents and/or overvoltage. In FIG. 3, the detection means 146 is illustrated as being connected to the HVDC line 102, but other connections are possible, e.g. a connection to the apparatus 302; 502; 702. The first and second switches 142, 144 may be arranged to be in the non-conducting mode when no over-current or overvoltage occurrence is detected by the detection means 146 and may be arranged to be set to the conducting mode when an over-current or overvoltage occurrence is detected by the detection means 146 to electrically bypass the apparatus 302; 502; 702. The detection means 146 may comprise measuring means 148 for measuring the current and/or voltage of the HVDC line 102 and/or of the apparatus 302; 502; 702. The measuring means 148 may be in the form of at least one current sensor and/or at least one voltage sensor. The protection device 136 may comprise control equipment 150 for controlling the bypass device 138. More precisely, the control equipment 150 may be arranged to control first and second switches 142, 144. The control equipment 150 may be connected to the detection means 146. The control equipment 150 may be arranged to set the first and second switches 142, 144 to the conducting mode upon the detection of an over-current or overvoltage occurrence. Further, the control equipment 150 may be arranged to set each switch 142, 144 to the non-conducting mode. The control equipment 150 may comprise suitable processing means, e.g. a CPU. The arrangement may comprise a plurality of air core inductors or reactors 152, 154 connected in series with the HVDC line 102 and with the apparatus 302; 502; 702. The rate of any increase in current, because of a fault occurrence, will be limited by the air core inductors or reactors 152, 154. However, the air core inductors or reactors 152, 154 may be excluded. The second switch 144 may be arranged to switch to the conducting mode before the first switch 142 is switched to the conducting mode. The second switch 144 may be arranged to switch to the non-conducting mode before the first switch 142 is switched to the non-conducting mode.

Figure 4:
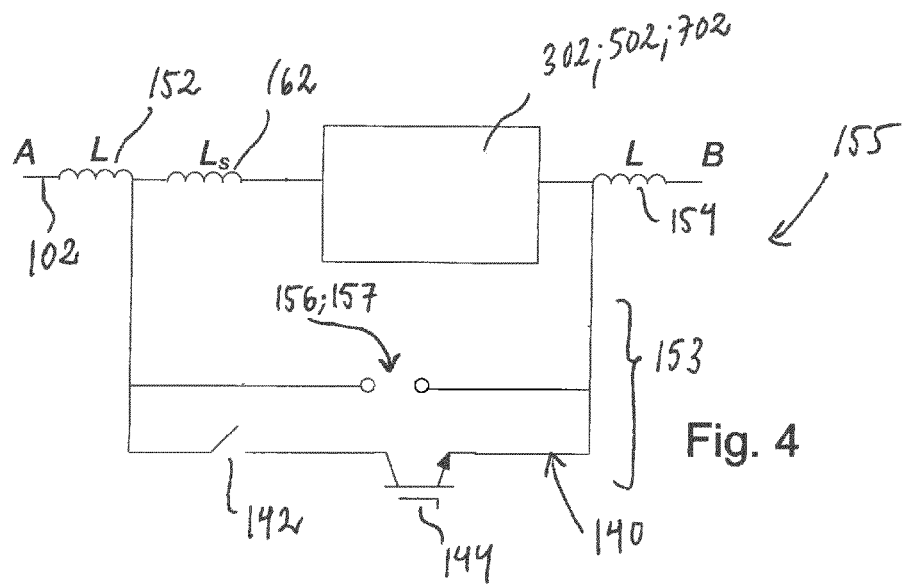
FIG. 4 is a schematic block diagram illustrating a second embodiment of the arrangement according to the present invention.
Figure 5A:
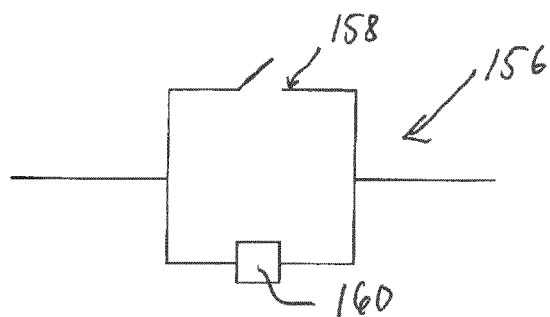
FIG. 5A is a schematic block diagram illustrating a first embodiment of the second bypass unit of a bypass device.
Figure 5B:
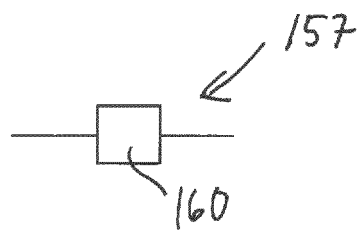
FIG. 5B is a schematic block diagram illustrating a second embodiment of the second bypass unit of a bypass device.

With reference to FIG. 4 and FIGS. 5A-B, a second embodiment of the arrangement according to the present invention is schematically illustrated. The second embodiment of the arrangement may comprise all the components of the first embodiment of FIG. 3, but in addition, the bypass device 153 of the protection device 155 may comprise a second bypass unit 156; 157 connected in parallel with the first bypass unit 140. The second bypass unit 156 may comprise at least one high speed switch. The at least one high speed switch of the second bypass unit 156 may be arranged to switch to its conducting mode within a closing time period shorter than the closing time period of any of the first and second switches 142, 144.

With reference to FIG. 5A, the second bypass unit 156 may comprise a third switch 158 and a fourth switch 160 connected in parallel with the third switch 158, each of the third and fourth switches being switchable between a non-conducting mode and a conducting mode. The third switch 158 may comprise a mechanical switch and the fourth switch 160 may comprise a plasma switch, or a forced triggered spark gap, e.g. a fast-acting high power plasma switch. The third switch 158 may comprise a high speed mechanical switch. The fourth switch 160 may be arranged to switch to its conducting mode within a closing time period shorter than the closing time period of any of the first and second switches 142, 144.

Alternatively, with reference to FIG. 5B, the second bypass unit 157 may comprise the fourth switch 160 with the third switch 158 excluded.

The protection device 155 of the second embodiment of the arrangement may comprise detection means and control equipment corresponding to those of the first embodiment of FIG. 3, but in addition the control equipment of the second embodiment of the arrangement may be arranged to also control the switches 158, 160 of the second bypass unit 156; 157. The second bypass unit 156 may be of CapThor™ type. A third inductor 162 may be connected in series with the HVDC line 102 to provide a voltage to the second bypass unit 156 and support the operation of the fourth switch 160 when being a plasma switch, or a forced triggered spark gap. When an over-current or overvoltage occurrence is detected, the fourth switch 160 may be the first one to switch to the conducting mode, and current is diverted from the apparatus 302; 502; 702 to the second bypass unit 156; 157. When the first and second switches 142, 144 have been set to the conducting mode, the current may be diverted to the first bypass unit 140 from the second bypass unit 156; 157, after which the second bypass unit 156; 157 does not need to carry any current. Thus, the switches of the second bypass unit 156; 157 can be configured to be very fast but do not need to be configured to carry current for a long time. Consequently, a fast protection of the apparatus 302; 502; 702 is provided while the power transmission in the HVDC line 102 is ensured for a long period of time.

Figure 6A:
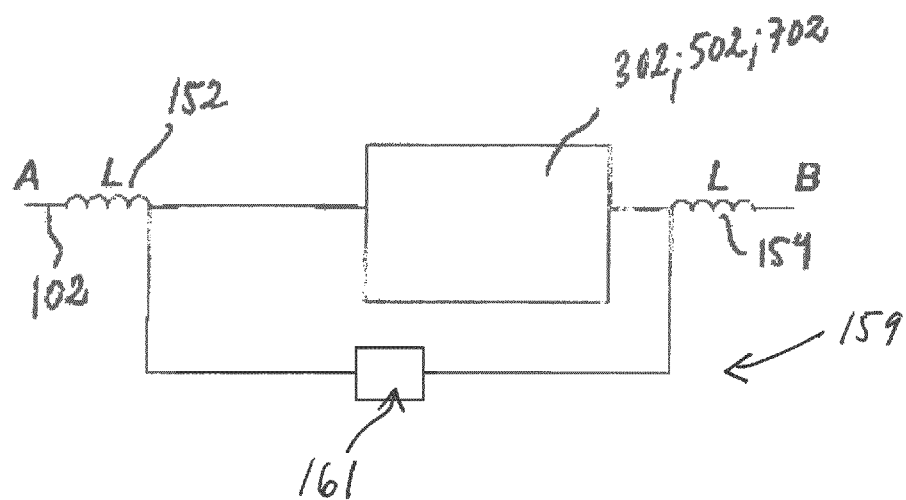
FIG. 6A is a schematic block diagram illustrating a third embodiment of the arrangement according to the present invention.

With reference to FIG. 6A, a third embodiment of the arrangement according to the present invention is schematically illustrated. The arrangement comprises a protection device 159 for protecting the apparatus 302; 502; 702 against over-current or overvoltage occurrences. The protection device 159 comprises a bypass device 161 connectable to the HVDC line 102 and connected in parallel with the apparatus 302; 502; 702. The bypass device 161 is arranged to be in a non-conducting mode, and the bypass device 161 is arranged to be set to a conducting mode. The bypass device 161 may be arranged to be set from the non-conducting mode to the conducting mode. The bypass device 161 may be arranged to be set between the non-conducting mode and the conducting mode. The bypass device 161 may comprise a switch corresponding to the first switch 142 or the second switch 144 as disclosed above. Alternatively, the bypass device 161 may comprise a second bypass unit 156; 157 as disclosed above.

When the bypass device 161 is in the conducting mode it is arranged to conduct direct current of the HVDC line 102 to electrically bypass the apparatus 302; 502; 702 for protecting the apparatus 302; 502; 702 against over-current or overvoltage occurrences. The protection device 159 of the third embodiment of the arrangement may comprise detection means and control equipment essentially corresponding to those of the first embodiment of FIG. 3. The bypass device 161 may be arranged to be non-conducting when no over-current or overvoltage occurrence is detected by the detection means and may be arranged to be set to the conducting mode when an over-current or overvoltage occurrence is detected by the detection means to electrically bypass the apparatus 302; 502; 702. The arrangement may comprise a plurality of air core inductors or reactors 152, 154 as disclosed above. However, the air core inductors or reactors 152, 154 may be excluded.

Figure 6B:
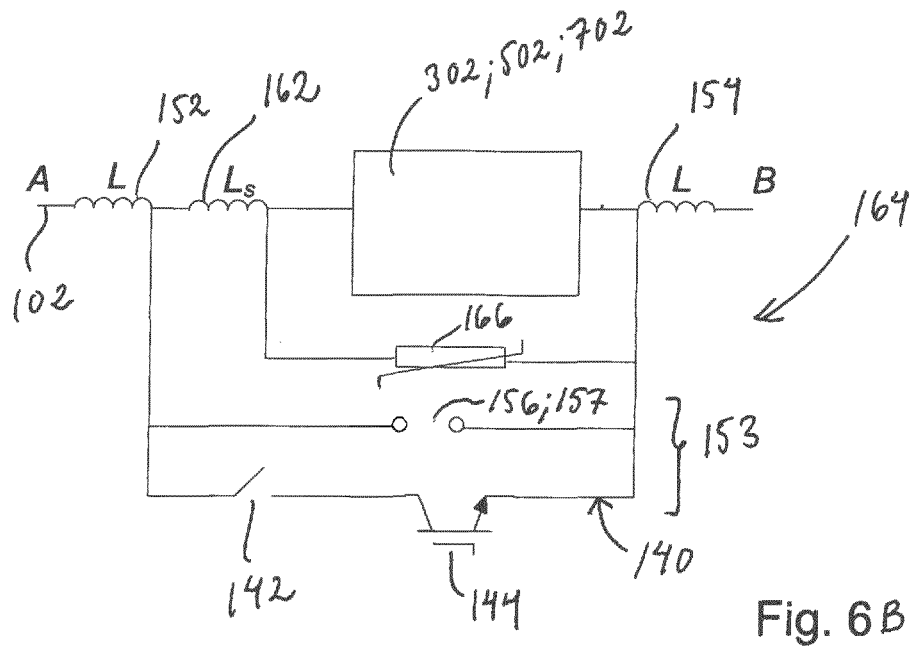
FIG. 6B is a schematic block diagram illustrating a fourth embodiment of the arrangement according to the present invention.

With reference to FIG. 6B, a fourth embodiment of the arrangement according to the present invention is schematically illustrated. The fourth embodiment of the arrangement may comprise all the components of the second embodiment of FIGS. 4 to 5A-B, but in addition, the protection device 164 comprises a voltage-dependent nonlinear resistor 166 connected in parallel with the apparatus 302; 502; 702. The protection device 164 of FIG. 6B may thus comprise a bypass device 153 corresponding to the bypass device 153 of the second embodiment of the arrangement of FIG. 4. The voltage-dependent nonlinear resistor 166 may comprise a surge arrester. The voltage-dependent nonlinear resistor 166 per se, such as a surge arrester or lightning arrester, can be structured in various ways known to the skilled person, and may e.g. be in the form of a Metal Oxide Varistor, MOV, such as a zinc oxide surge arrester. However, other types of voltage-dependent nonlinear resistor are possible. When, over-current or overvoltage occurs, current will immediately be diverted to the conducting voltage-dependent nonlinear resistor 166, giving an instant protection of the apparatus 302; 502; 702, after which current is diverted to the bypass device 153 of the protection device 164 and its conducting switches 142, 144.

Figure 7:
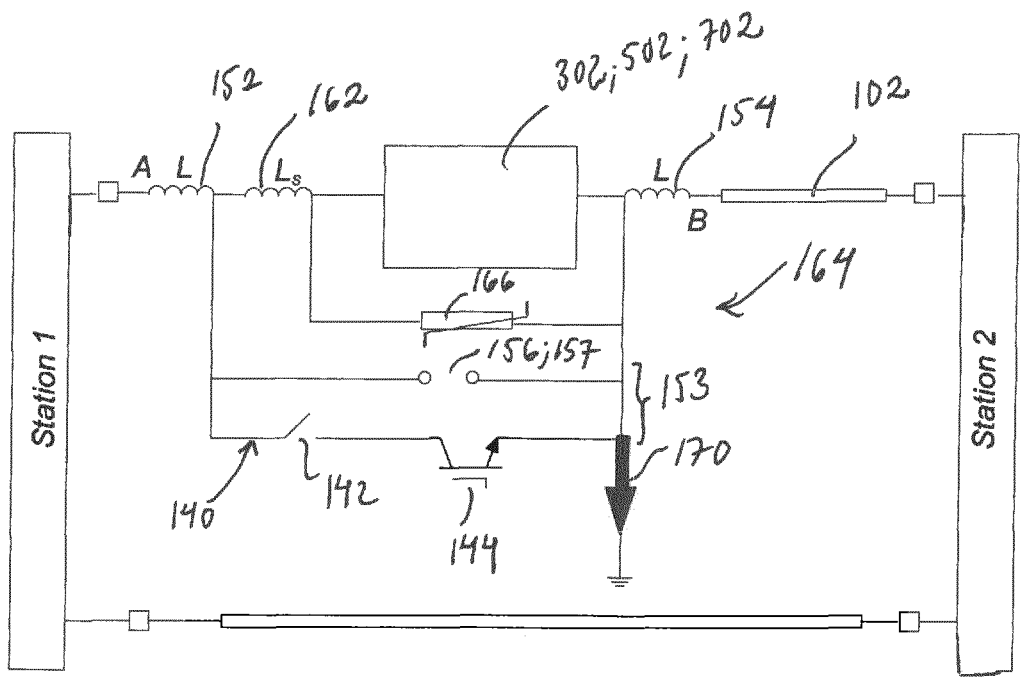
FIG. 7 is a schematic block diagram illustrating the fourth embodiment of the arrangement according to the present invention.

In FIG. 7, the fourth embodiment of the arrangement of FIG. 6B is illustrated in a larger context. Station 1 in FIG. 7 corresponds to a converter station on the left side in FIG. 1, and Station 2 corresponds to a converter station on the right side in FIG. 1. A pole to ground fault is assumed to be in a location as shown by arrow 170 in FIG. 7. It is assumed that the apparatus 302; 502; 702 was in operation and direct current was flowing from Station 1 to Station 2 before the fault. Immediately after the fault has occurred, current through the apparatus 302; 502; 702 will start increasing. However, the rate of the current increase will be limited by the air core inductors 152, 154. After the fault is detected by the detector means, the apparatus 302; 502; 702 may be blocked by means of the apparatus's electronic control switches, e.g. power semiconductor switches, such as IGBTs (see FIGS. 10, 12, 14), i.e. the gate pulses may be removed. This process may take approximately 1 ms, or less. Thereafter the current will be diverted to the voltage-dependent nonlinear resistor 166 and the voltage across the apparatus 302; 502; 702 will be limited to a protective level. However, the voltage-dependent nonlinear resistor 166 may not be able to carry the current for a long time due to energy limitations, and thus, after some time the at least one switch of the second bypass unit 156; 157 is set to the conducting mode to bypass the voltage-dependent nonlinear resistor 166. After the at least one switch of the second bypass unit 156; 157 takes the full current, the first and second switches 142, 144 of the first bypass unit 140 may be set to the conducting mode, and the current is conducted through the first and second switches 142, 144 while the apparatus 302; 502; 702 is in a bypassed position. The first and second switches 142, 144 of the first bypass unit 140 may remain in the conducting mode for a long time, during which time the apparatus 302; 502; 702 may be subjected to service or maintenance. When the apparatus 302; 502; 702 is to be reinserted in the HDCV line 102, after a fault case or after maintenance work, the apparatus 302, 502, 702 is already in a bypassed position where the first and second switches 142, 144 of the first bypass unit 140 are in the conducting mode and carry the current. The at least one switch of the second bypass unit 156; 157 is in the non-conducting mode and need not to take part in the process of reinserting the apparatus. When inserting the apparatus 302; 502; 702 in the HVDC line 102 and in order to make the current flow through the apparatus 302; 502; 702, the current of the bypass device 153 should be broken or interrupted. The current of the bypass device 153 is interrupted by setting the second switch 144 to the non-conducting mode and, after sometime, setting the first switch 142 of the first bypass unit 140 to the non-conducting mode.

Figure 8:
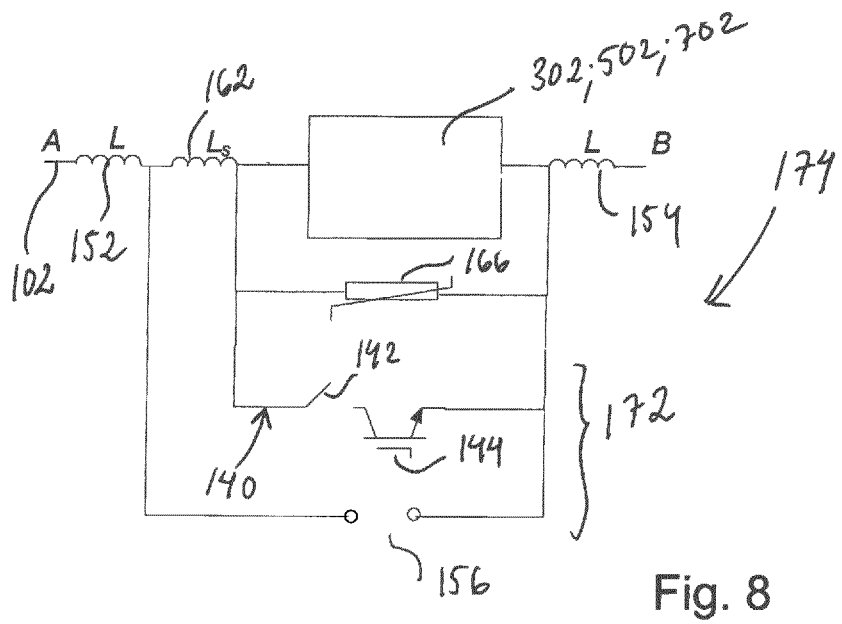
FIG. 8 is a schematic block diagram illustrating a fifth embodiment of the arrangement according to the present invention.

With reference to FIG. 8, a fifth embodiment of the arrangement according to the present invention is schematically illustrated, which essentially corresponds to the fourth embodiment of FIG. 6B, but where the first bypass unit 140 of the bypass device 172 of the protection device 174 is connected in parallel with the voltage-dependent nonlinear resistor 166 but not in parallel with the third inductor 162. By means of the fifth embodiment, the at least one electronic switch of the second switch 144 is substantially not influenced by any voltage increase across the third inductor 162.

With reference to FIGS. 9-14, three embodiments of the apparatus of the arrangement 101 are now described in more detail. Each apparatus 302; 502; 702 may comprise at least one first converter 304; 506; 704 for converting alternating current, AC, to direct current and/or direct current to alternating current, the at least one first converter having an AC side for output and/or input of alternating current and a DC side for output and/or input of direct current. The at least first one first converter of each apparatus 302; 502; 702 may comprise a Voltage Source Converter, VSC. The at least first one first converter of each apparatus 302; 502; 702 may comprise a plurality of power semiconductor switches. Each apparatus 302; 502; 702 may be connectable to a DC source or an AC source and/or may comprise the DC source or the AC source. Each apparatus 302; 502; 702 may comprise an electric power transformer 318; 512; 718. The at least one first converter of each apparatus 302; 502; 702 may be connectable via its DC side to the HVDC line 102, and may be connectable in series with the HVDC line 102.

Figure 9:
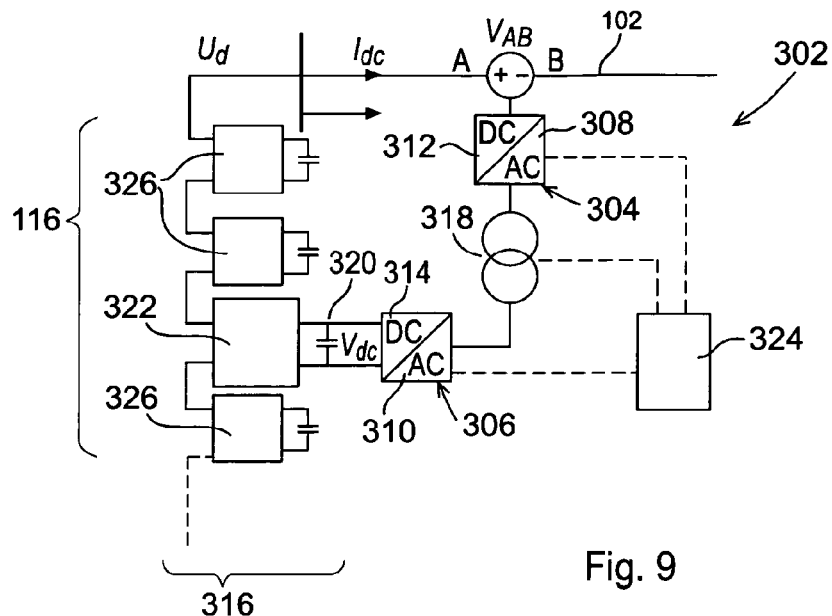
FIG. 9 is a schematic block diagram illustrating a first embodiment of the apparatus according to the present invention.
Figure 10:
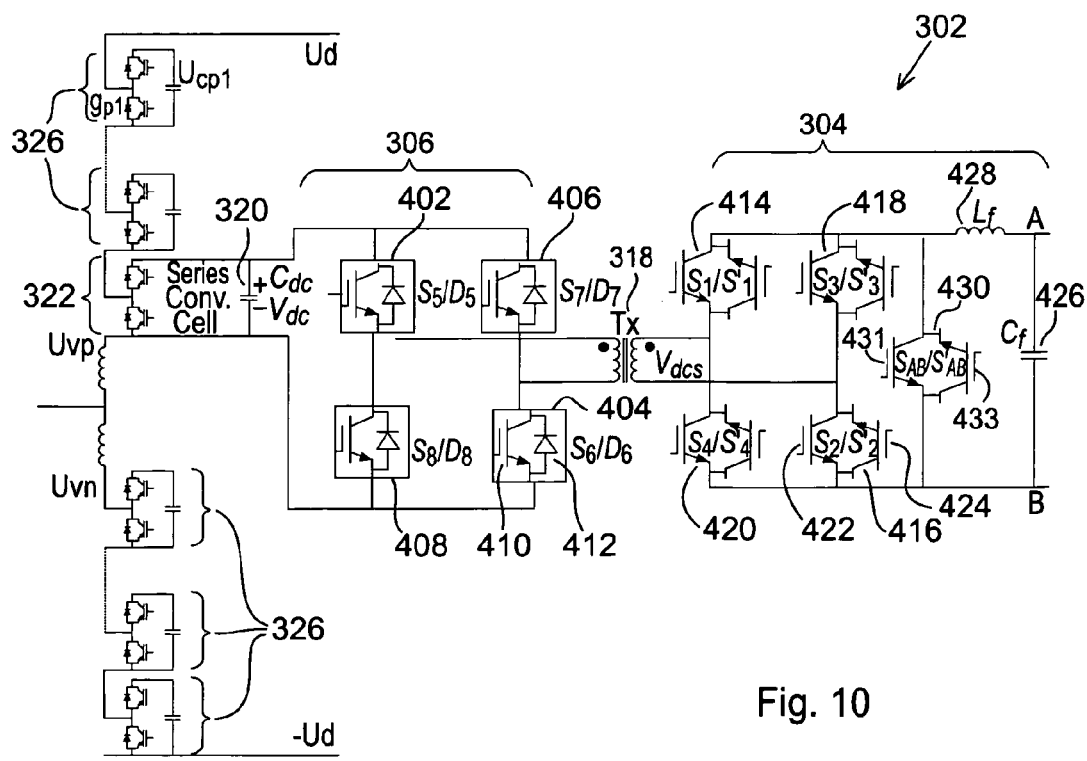
FIG. 10 is a schematic diagram illustrating aspects of the apparatus of FIG. 9 in more detail.

With reference to FIGS. 9-10, a first embodiment of the arrangement's 101 apparatus 302 is schematically illustrated. The apparatus 302 may comprise a first converter 304 for converting alternating current to direct current and/or direct current to alternating current, and a second converter 306 for converting direct current to alternating current and/or alternating current to direct current. Each of the first and second converters 304, 306 has an AC side 308, 310 for output and/or input of alternating current and a DC side 312, 314 for output and/or input of direct current. The first converter 304 may be electrically connectable via its DC side 312 to the HVDC line 102, and the first converter 304 may be electrically connectable in series with the HVDC line 102. The AC side 308 of the first converter 304 may be connected to the AC side 310 of the second converter 306. The second converter 306 may be connectable via its DC side 314 to a DC source 316, which will be disclosed in more detail hereinafter. The apparatus 302 may comprise the DC source 316. The apparatus 302 may also comprise an electric power transformer 318, also indicated as $T_x$ in FIG. 10, connected between the first and second converters 304, 306, each of the first and second converters 304, 306 being electrically connectable, or connected, via its AC side 308, 310 to the electric power transformer 318. The electric power transformer 318 may be a high frequency transformer, and the second converter 306 may be adapted to convert DC voltage to high frequency AC voltage. The electric power transformer 318 may be adapted to isolate the first converter 304 from the DC source 316, and may thus also be adapted to isolate the HVDC line 102 from the DC source 316. The DC source 316 may comprise an apparatus cell capacitor 320, also indicated as $C_{dc}$ in FIG. 10, to which the second converter 306 may be connectable via its DC side 314. The DC source 316 may comprise a first cascaded half-bridge cell 322, to which the apparatus cell capacitor 320 may be connected. Instead of a first cascaded half-bridge cell 322, a first cascaded full-bridge cell may be used. The structure of the first cascaded half-bridge cell 322 may correspond to the structure of conventional cascaded half-bridge cells and is well known to the skilled person and therefore not discussed in more detail.

The first cascaded half-bridge cell 322 may be arranged to be part of a converter station 116 included in the HVDC power transmission system, e.g. as illustrated in FIG. 1. The DC source 316 may comprise a plurality of cascaded half-bridge cells 326, to which the first cascaded half-bridge cell 322 may be connectable, and the plurality of cascaded half-bridge cells 326 may also be adapted to be part of the converter station 116. Any of the plurality of cascaded half-bridge cells may form the first cascaded half-bridge cell to which the apparatus 302 is arranged to be connected, i.e. the apparatus 302 may be connected to any of the cascaded half-bridge cells 326 instead of the first cascaded half-bridge cell 322 as indicated in FIGS. 9 and 10. Instead of a plurality of cascaded half-bridge cells, a plurality of cascaded full-bridge cells, or a mixture thereof, may be used. The apparatus 302 may be connected to any one or a plurality of the converter stations 116, 118, 120, 122, 124 of a HVDC power transmission system. The structure of a conventional converter station and how it is built up of cascaded half-bridge cells 322, 326 are well known to the skilled person.

With reference to FIG. 10, aspects of the apparatus of FIG. 9 are schematically illustrated in more detail. The second converter 306 may comprise a VSC and may comprise four pairs 402, 404, 406, 408, also indicated as $S_5/D_5$, $S_6/D_6$, $S_7/D_7$, $S_8/D_8$ in FIG. 10, of electrically interconnected electronic control devices 410, 412. Each pair of electronic control devices 410, 412 may comprise an electronic control switch 410 and a diode 412. The first converter 304 may comprise a full-bridge converter. The first converter 304 may comprise four pairs 414, 416, 418, 420, also indicated as $S_1/S'_1$, $S_2/S'_2$, $S_3/S'_3$, $S_4/S'_4$ in FIG. 10, of electrically interconnected electronic control switches 422, 424. The first converter 304 may also comprise a fifth pair 430 of electronic control switches 431, 433, also indicated as $S_{AB}/S'_{AB}$. The fifth pair 430 of electronic control switches may be electrically connected in parallel with the four pairs 414, 416, 418, 420 of electronic control switches. The first converter 304 may comprise filter means 426, 428 connected to the electronic control switches 422, 424, for smoothing out the voltage and current ripple caused by the switching of the electronic control switches 422, 424. The filter means may comprise a capacitor 426, also indicated as $C_f$ in FIG. 10, and an inductor 428, also indicated as $L_f$. The capacitor 426 may be connected in parallel with the electronic control switches 422, 424. The inductor 428 may be electrically connected in series with the electronic control switches 422, 424. The capacitor 426 may be connected in parallel with the fifth pair 430 of electronic control switches.

The filter inductor 428 may be connected in series with the first converter DC terminal with a first end connected to the common point of 414, 418 and 430, and with the a second end connected to the filter capacitor 426. The other end of the filter capacitor 426 may be connected to the common point of 420, 416 and 430. This connection may also be reversed, i.e. the first end of the filter inductor 428 may be connected to the common point of 420, 416 and 430, and the second end of the filter inductor 428 may be connected to the filter capacitor 426. The other end of the filter capacitor 426 may be connected to the common point of 414, 418 and 430.

The power requirement of first converter 304 may be supplied from the second converter 306 connected via the electric power transformer 318. The VSC of the second converter 306 may comprise at least two legs which convert direct current to alternating current and/or vice-versa. To effect or introduce a positive fictive resistance, $+\Delta R_{inj}$, active power should be absorbed by the DC source, and to effect or introduce a negative fictive resistance, $-\Delta R_{inj}$, active power should be injected by and from the DC source. To maintain the DC voltage $V_{dc}$ of the apparatus cell capacitor 320, the active power should be exchanged between the apparatus cell capacitor 320 and the converter station 116 to which the apparatus 302 is connected. The power exchange may be attained by the converter station cell voltage control. The first cascaded half-bridge cell 322, which is connected to the apparatus 302, may have more voltage variations compared to the other cascaded half-bridge cells 326 of the converter station 116. By using a cascaded half-bridge cell already present in a converter station 116, the manufacturing costs of the apparatus 302 of the present invention are kept at a low level. However, an extra cascaded half-bridge cell, to which the apparatus is connectable, may also be added to be part of a converter station 116. If an extra cascaded half-bridge cell is not added, the operation control of the converter station 116 is altered, whereas if an If an extra cascaded half-bridge cell is added, the operation control of the converter station 116 may be unchanged. The apparatus 302 may be floating above the ground potential, and suitable insulation for the apparatus may be provided.

Figure 11:
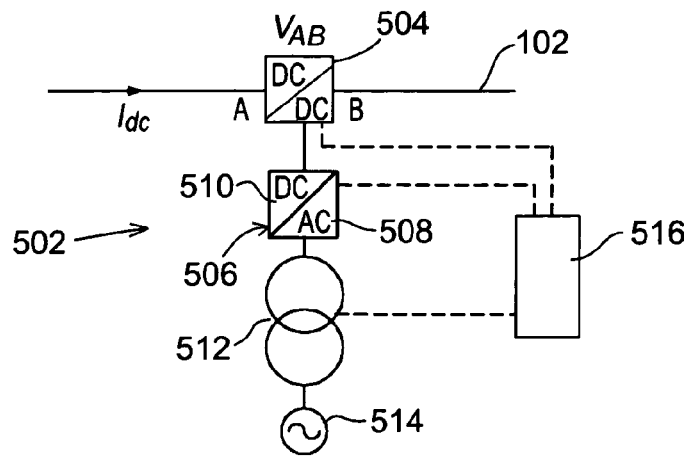
FIG. 11 is a schematic block diagram illustrating a second embodiment of the apparatus according to the present invention.
Figure 12:
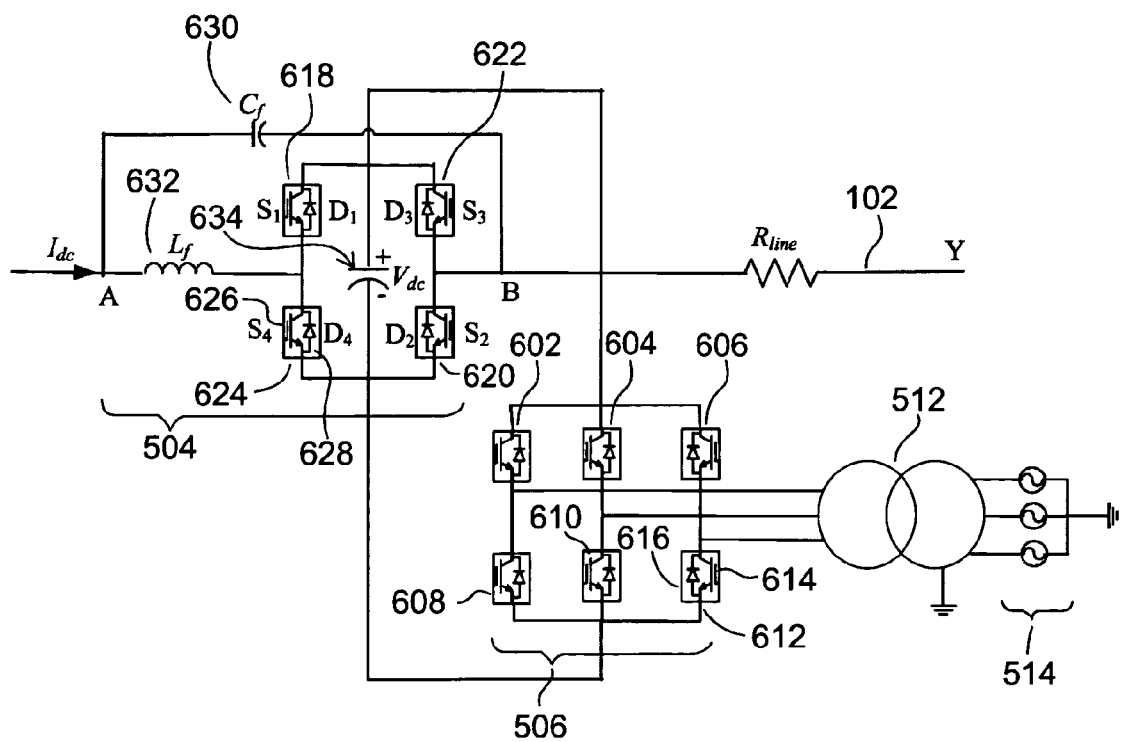
FIG. 12 is a schematic diagram illustrating aspects of the apparatus of FIG. 11 in more detail.

With reference to FIGS. 11-12, a second embodiment of the arrangement's 101 apparatus 502 is schematically illustrated. The apparatus 502 may comprise a DC-to-DC converter 504 having two DC sides for output and/or input of direct current and may be adapted to convert direct current from a first voltage level to a second voltage level. The DC-to-DC converter 504 may be electrically connectable to the HVDC line 102, and the DC-to-DC converter 504 may be electrically connectable in series with the HVDC line 102. The DC-to-DC converter 504 may be adapted to regulate its output voltage. The apparatus 502 may comprise a second converter 506 for converting direct current to alternating current and/or alternating current to direct current. The second converter 506 has an AC side 508 for output and/or input of alternating current and a DC side 510 for output and/or input of direct current. The second converter 506 may be connected via its DC side 510 to the DC-to-DC converter 504. The DC side 510 of the second converter 506 may be arranged to provide direct current to the DC-to-DC converter 504, and/or vice versa. The second converter 506 may be connectable via its AC side 508 to an AC source 514. The apparatus 502 may comprise an electric power transformer 512 electrically connected to the AC side 508 of the second converter 506. The electric power transformer 512 may be a high frequency transformer. The electric power transformer 512 may be electrically connectable to the AC source 514, e.g. an AC grid. An AC grid is well known to the skilled person and therefore not discussed in more detail. The apparatus 502 may comprise the AC source 514. The apparatus 502 is arranged to control the direct current of the HVDC line 102 by introducing a DC voltage in series with the HVDC line 102. The electric power transformer 312 may be adapted to isolate the DC-to-DC converter 504 from the AC source 514, and may thus also be adapted to isolate the HVDC line 102 from the AC source 514.

With reference to FIG. 12, aspects of the apparatus of FIG. 11 are schematically illustrated in more detail. The second converter 506 may comprise a VSC and may comprise six pairs 602, 604, 606, 608, 610, 612 of electrically interconnected electronic control devices 614, 616. Each pair of electronic control devices 614, 616 may comprise an electronic control switch 614 and a diode 616. The DC-to-DC converter 504 may comprise a full-bridge converter. The DC-to-DC converter 504 may comprise four pairs 618, 620, 622, 624, also indicated as $S_1/D_1$, $D_2/S_2$, $D_3/S_3$, $S_4/D_4$ in FIG. 12, of electrically interconnected electronic control devices 626, 628. Each pair of electronic control devices 626, 628 of the DC-to-DC converter 504 may comprise an electronic control switch 626 and a diode 628. The DC-to-DC converter 504 may comprise filter means 630, 632 connected to the electronic control switches 626, for smoothing out the voltage and current ripple caused by the switching of the electronic control switches 626. The filter means may comprise a filter capacitor 630, also indicated as $C_f$ in FIG. 12, and an inductor 632, also indicated as $L_f$. The filter capacitor 630 may be connected in parallel with the electronic control switches 626, and/or connected in parallel with the four pairs 618, 620, 622, 624 of electronic control devices of the DC-to-DC converter 504. The inductor 632 may be electrically connected in series with the electronic control switches 626, and/or connected in parallel with the four pairs 618, 620, 622, 624 of electronic control devices of the DC-to-DC converter 504. The filter inductor 632 may be connected by connecting one end to the midpoint of a first leg (e.g. common point of 618 and 624) and by connecting the other end to one end of the filter capacitor 630, where the other end of the filter capacitor 630 may be connected between the midpoint of a second leg (e.g. common point of 620 and 622). The DC-to-DC converter 504 may also comprise a DC capacitor 634 electrically connected to the electronic control devices of the DC-to-DC converter 504. The second converter 506 may be adapted to control the voltage $V_{dc}$ of the DC capacitor 634.

Figure 13:
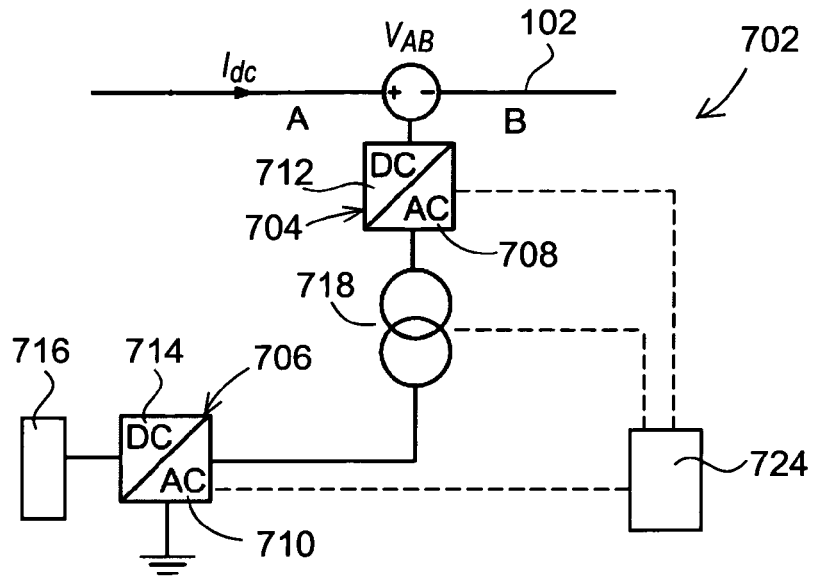
FIG. 13 is a schematic block diagram illustrating a third embodiment of the apparatus according to the present invention.
Figure 14:
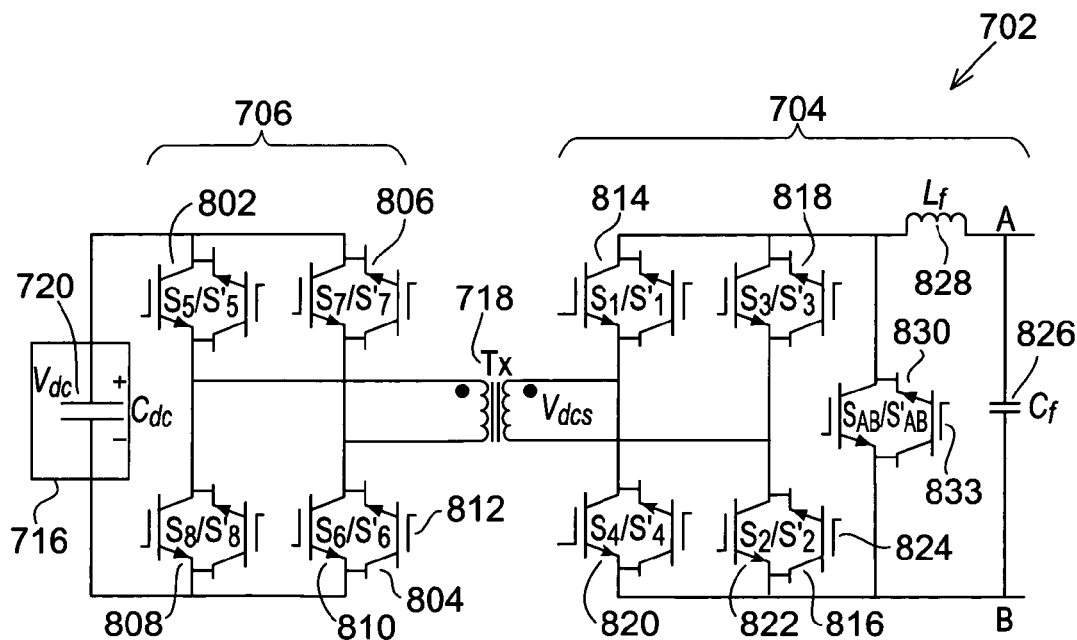
FIG. 14 is a schematic diagram illustrating aspects of the apparatus of FIG. 13 in more detail.

With reference to FIGS. 13-14, a third embodiment of the arrangement's 101 apparatus 702 is schematically illustrated. The apparatus 702 may comprise a first converter 704 for converting alternating current to direct current and/or direct current to alternating current, and a second converter 706 for converting direct current to alternating current and/or alternating current to direct current. Each of the first and second converters 704, 706 has an AC side 708, 710 for output and/or input of alternating current and a DC side 712, 714 for output and/or input of direct current. The first converter 704 may be electrically connectable via its DC side 712 to the HVDC line 102, and the first converter 704 may be electrically connectable in series with the HVDC line 102. The AC side 708 of the first converter 704 may be adapted to provide alternating current to the AC side 710 of the second converter 706, and vice versa. The second converter 706 may be connectable via its DC side 714 to a DC source 716, e.g. an electric battery or a HVDC grid. An electric battery and a HVDC grid are well known to the skilled person and therefore not discussed in more detail. The apparatus 702 may comprise the DC source 716. The apparatus 702 may comprise an electric power transformer 718 connected between the first and second converters 704, 706, each of the first and second converters 704, 706 being electrically connectable, or connected, via its AC side 708, 710 to the electric power transformer 718. The electric power transformer 718 may be adapted to isolate the first converter 704 from the DC source 716, and may thus also be adapted to isolate the HVDC line 102 from the DC source 716. The DC source 716 may comprise an apparatus capacitor 720 (see FIG. 14) to which the second converter 706 may be electrically connectable via its DC side 714.

With reference to FIG. 14, aspects of the apparatus of FIG. 13 are schematically illustrated in more detail. The second converter 706 may comprise a VSC and may comprise four pairs 802, 804, 806, 808, also indicated as $S_5/S'_5$, $S_6/S'_6$, $S_7/S'_7$, $S_8/S'_8$ in FIG. 14, of electrically interconnected electronic control switches 810, 812. The first converter 704 may comprise a full-bridge converter. The first converter 704 may comprise four pairs 814, 816, 818, 820, also indicated as $S_1/S'_1$, $S_2/S'_2$, $S_3/S'_3$, $S_4/S'_4$ in FIG. 14, of electrically interconnected electronic control switches 822, 824. The first converter 704 may also comprise a fifth pair 830 of electronic control switches 831, 833, also indicated as $S_{AB}/S'_{AB}$ in FIG. 14. The fifth pair 830 of electronic control switches may be electrically connected in parallel with the four pairs 814, 816, 818, 820 of electronic control switches. The fifth pair 830 of electronic control switches may be used to give a path to the direct current when the first converter 704 is bypassed to give zero voltage. The first converter 704 may comprise filter means 826, 828, connected to the electronic control switches 822, 824, for smoothing out the voltage and current ripple caused by the switching of the electronic control switches 822, 824. The filter means may comprise a capacitor 826, also indicated as $C_f$ in FIG. 14, and an inductor 828, also indicated as $L_f$. The capacitor 826 may be connected in parallel with the electronic control switches 822, 824. The inductor 828 may be electrically connected in series with the electronic control switches 822, 824. The capacitor 826 may be connected in parallel with the fifth pair 830 of electronic control switches.

The filter inductor 828 may be connected in series with the first converter DC terminal having a first end connected to the common point of 814, 818 and 830, and having a second end connected to the filter capacitor 826. The other end of the filter capacitor 826 may be connected to the common point of 820, 816 and 830. This connection may also be reversed, i.e. the first end of the filter inductor 828 may be connected to the common point of 820, 816 and 830, and the second end of the filter inductor 828 may be connected to the filter capacitor 826. The other end of the filter capacitor 826 may be connected to the common point of 814, 818 and 830. The power requirement of first converter 704 may be supplied from the second converter 706 via the electric power transformer 718. The VSC of the second converter 706 may comprise at least two legs which convert direct current to alternating current and/or vice-versa. To effect or introduce a positive fictive resistance, $+\Delta R_{inj}$, active power should be absorbed by the DC source 716, and to effect or introduce a negative fictive resistance, $-\Delta R_{inj}$, active power should be injected by and from the DC source 716.

Each of the above-mentioned electronic control switches, e.g. as shown in FIGS. 10, 12 and 14, may comprise a power semiconductor switch, such as a transistor, e.g. an IGBT, a BIGT or any other suitable transistor. Alternatively, each of the above-mentioned electronic control switches may comprise a thyristor, e.g. a GTO, an IGCT, or a Forced Commutated Thyristor.

With reference to FIGS. 9, 11 and 13, and as previously stated above, each apparatus 302; 502; 702 is arranged to control the direct current of the HVDC line 102 by introducing a DC voltage $V_{AB}$ in series with the HVDC line 102. Each apparatus 302; 502; 702 may comprise control means 324; 516; 724, e.g. a computer or a CPU, for controlling the apparatus 302; 502; 702 and its various components. The control means 324; 516; 724 may be arranged to control the apparatus 302; 502; 702 to introduce a positive DC voltage, $V_{AB}>0$, in series with the HVDC line 102 for reducing the direct current, i.e. $I_{DC}$ of the HVDC line 102, and the control means 324; 516; 724 may be arranged to control the apparatus 302; 502; 702 to introduce a negative DC voltage, $V_{AB}<0$, in series with the HVDC line 102 for increasing $I_{DC}$ of the HVDC line 102. The above-mentioned fictive resistance $\Delta R_{ink}$ may be defined by the following expression: $\Delta R_{inj}=V_{AB}/I_{DC}$.

Figure 15:
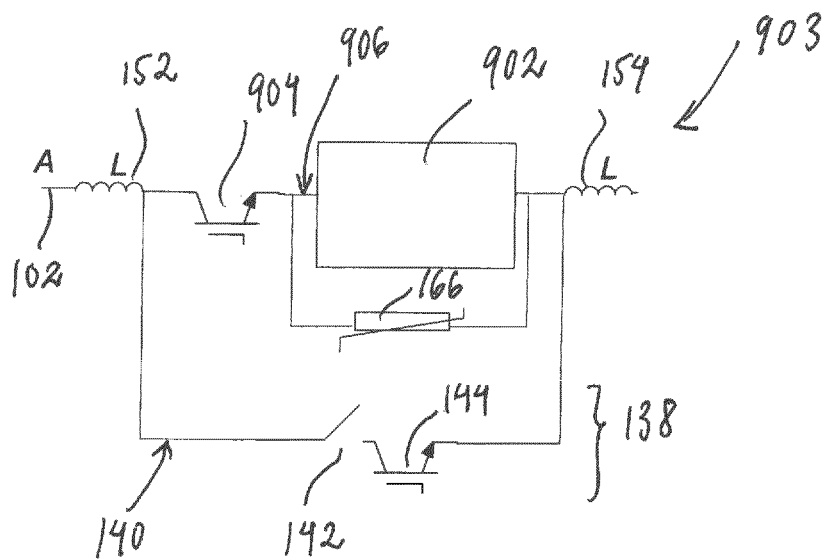
FIG. 15 is a schematic block diagram illustrating a sixth embodiment of the arrangement according to the present invention.

With reference to FIG. 15, a sixth embodiment of the arrangement 101 according to the present invention is schematically illustrated. The arrangement of FIG. 15 comprises a fourth embodiment of the apparatus 902 connectable to the HVDC line 102 and arranged to control the direct current of the HVDC line 102 by introducing a DC voltage in series with the HVDC line 102. The apparatus 902 may comprise at least one first converter for converting alternating current, AC, to direct current and/or direct current to alternating current, the at least one first converter having an AC side for output and/or input of alternating current and a DC side for output and/or input of direct current. The at least first one first converter of the apparatus 902 may comprise a plurality of power semiconductor switches. The at least one first converter of the apparatus 902 may comprise a Line Commutated Converter, LCC, and may be thyristor-based. The apparatus 902 may be connectable to an AC source. The arrangement of FIG. 15 comprises a protection device 903 which may comprise a voltage-dependent nonlinear resistor 166 connected in parallel with the apparatus 902. Further, the protection device 903 of FIG. 15 comprises a fifth switch 904 connectable in series with the HVDC line 102, the fifth switch 904 being switchable between a non-conducting mode and a conducting mode. The arrangement of FIG. 15 may comprise a series connection 906 of the apparatus 902 and of the fifth switch 904. The fifth switch 904 may comprise at least one electronic switch, and the at least one electronic switch of the fifth switch 904 may comprise at last one power semiconductor switch. The protection device 903 may comprise a bypass device 138 corresponding to the bypass device of the first embodiment of the arrangement of FIG. 3, but the bypass device 138 of the protection device 903 of FIG. 15 is connected in parallel with said series connection 906 of the of the apparatus 902 and of the fifth switch 904. The protection strategy for LCC-based apparatus 902 may be as follows. The fifth switch 904 is in the conducting mode during normal operation. After fault, the second switch 144 and subsequently the first switch 142 are set to the conducting mode. Subsequently, the fifth switch 904 is set to the non-conducting mode to divert current to the first bypass unit 140. The overload capacity of the thyristors in the apparatus 902 is used to withstand the increased current from time of the initiation of the fault until the setting of the first switch 142 to the non-conducting mode. Upon re-insertion of the apparatus 902, the first and second switches 142, 144 of the first bypass unit 140 being already in the conducting mode, the fifth switch 904 is set to the conducting mode. After that the first and second switches 142, 144 of the first bypass unit 140 are set to the non-conducting mode and current is diverted to the apparatus 902.

The invention shall not be considered limited to the embodiments illustrated, but can be modified and altered in many ways by one skilled in the art, without departing from the scope of the appended claims. For example, the disclosed embodiments may be combined in various possible ways, and additional electric equipment, devices or units may be connected to and between the components of the embodiments.

The invention claimed is:

1. An arrangement for controlling the electric power transmission in a high voltage direct current, HVDC, power transmission system comprising at least one HVDC transmission or distribution line for carrying direct current, DC, the arrangement comprising:
    an apparatus connectable to the HVDC transmission or distribution line, the apparatus being arranged to control the direct current of the HVDC transmission or distribution line by introducing a DC voltage in series with the HVDC transmission or distribution line; and
    a protection device for protecting the apparatus against over-current or overvoltage occurrences, the protection device comprising a bypass device connectable to the HVDC transmission or distribution line and connected in parallel with the apparatus, the bypass device being arranged to be in a non-conducting mode, and arranged to be set to a conducting mode, and when in the conducting mode, the bypass device is arranged to conduct direct current of the HVDC transmission or distribution line flowing in a direction on the HVDC transmission or distribution line to electrically bypass the apparatus and flow in the same direction on the HVDC transmission or distribution line,
    wherein the protection device comprises a detector configured to detect over-current and/or overvoltage occurrences in the HVDC power transmission system, in the HVDC transmission or distribution line and/or in the apparatus.

2. The arrangement according to claim 1, wherein the protection device comprises control equipment for controlling the bypass device, and the control equipment is arranged to set the bypass device to the conducting mode when an over-current or overvoltage occurrence is detected by the detector.

3. The arrangement according to claim 1, wherein the arrangement comprises a controller configured to control the apparatus, the controller being arranged to control the apparatus to introduce a positive DC voltage in series with the HVDC transmission or distribution line for reducing the direct current of the HVDC transmission or distribution line, and the controller being arranged to control the apparatus to introduce a negative DC voltage in series with the HVDC transmission or distribution line for increasing the direct current of the HVDC transmission or distribution line.

4. The arrangement according to claim 1, wherein the apparatus comprises at least one first converter for converting alternating current, AC, to direct current and/or direct current to alternating current, the at least one first converter having an AC side for output and/or input of alternating current and a DC side for output and/or input of direct current.

5. The arrangement according to claim 4, wherein the apparatus is connectable to a DC source or an AC source.

6. The arrangement according to claim 4, wherein the apparatus comprises an electric power transformer.

7. The arrangement according to claim 4, wherein the at least one first converter is connectable via its DC side to the HVDC transmission or distribution line.

8. The arrangement according to claim 7, wherein the at least one first converter is connectable in series with the HVDC transmission or distribution line.

9. A high voltage direct current, HVDC, power transmission system comprising at least one HVDC transmission or distribution line for carrying direct current, DC, and a plurality of converter stations connected to the at least one HVDC transmission or distribution line, each of the converter stations being arranged to convert alternating current, AC, to direct current for input to the at least one HVDC transmission or distribution line, and/or direct current to alternating current, wherein the system comprises at least one arrangement as claimed in claim 1 for controlling the electric power transmission in the system.

10. The HVDC power transmission system according to claim 9, wherein the system comprises a plurality of HVDC transmission or distribution lines.

11. The HVDC power transmission system according to claim 9, wherein the system comprises at least three converter stations, or at least four converter stations.

12. The HVDC power transmission system according to claim 9, wherein the at least one HVDC transmission or distribution line-comprises at least one long-distance HVDC link.

13. A method for protecting an apparatus against over-current or overvoltage occurrences, the apparatus being included in an arrangement as claimed in claim 1 for controlling the direct current of the HVDC transmission or distribution line by introducing a DC voltage in series with the HVDC transmission or distribution line, wherein the method comprises the steps of:
- detecting an over-current or overvoltage occurrence; and
- electrically bypassing the apparatus when an over-current or overvoltage occurrence is detected.

14. An arrangement for controlling the electric power transmission in a high voltage direct current, HVDC, power transmission system comprising at least one HVDC transmission or distribution line for carrying direct current, DC, the arrangement comprising:
- an apparatus connectable to the HVDC transmission or distribution line, the apparatus being arranged to control the direct current of the HVDC transmission or distribution line by introducing a DC voltage in series with the HVDC transmission or distribution line; and
- a protection device for protecting the apparatus against over-current or overvoltage occurrences, the protection device comprising a bypass device connectable to the HVDC transmission or distribution line and connected in parallel with the apparatus, the bypass device being arranged to be in a non-conducting mode, and arranged to be set to a conducting mode, and when in the conducting mode, the bypass device is arranged to conduct direct current of the HVDC transmission or distribution line flowing in a direction on the HVDC transmission or distribution line to electrically bypass the apparatus but flow in the same direction on the HVDC transmission or distribution line,
- wherein the bypass device comprises a first bypass unit comprising a first switch and a second switch connected in series with the first switch, each of the first and second switches being switchable between a non-conducting mode and a conducting mode, and when being in the conducting mode the first switch and the second switch are arranged to conduct direct current of the HVDC transmission or distribution line to electrically bypass the apparatus for protecting the apparatus against over-current or overvoltage occurrences.

15. The arrangement according to claim 14, wherein at least one of the first switch and the second switch comprises a high speed switch.

16. The arrangement according to claim 14, wherein the first switch comprises a mechanical switch and the second switch comprises at least one electronic switch.

17. The arrangement according to claim 16, wherein the second switch comprises at least one power semiconductor switch.

18. The arrangement according to claim 16, wherein the first switch is a high speed mechanical switch.

19. The arrangement according to claim 16, wherein the bypass device comprises a second bypass unit connected in parallel with the first bypass unit, and the second bypass unit comprises at least one high speed switch.

20. The arrangement according to claim 19, wherein the at least one high speed switch of the second bypass unit is arranged to switch to its conducting mode within a closing time period shorter than the closing time period of any of the first and second switches.

21. The arrangement according to claim 19, wherein the second bypass unit comprises a third switch and a fourth switch connected in parallel with the third switch, each of the third and fourth switches being switchable between a non-conducting mode and a conducting mode, and the third switch comprises a mechanical switch and the fourth switch comprises a plasma switch.

22. The arrangement according to claim 21, wherein the third switch comprises a high speed mechanical switch.

23. The arrangement according to claim 21, wherein the fourth switch is arranged to switch to its conducting mode within a closing time period shorter than the closing time period of any of the first and second switches.

24. An arrangement for controlling the electric power transmission in a high voltage direct current, HVDC, power transmission system comprising at least one HVDC transmission or distribution line for carrying direct current, DC, the arrangement comprising:
- an apparatus connectable to the HVDC transmission or distribution line, the apparatus being arranged to control the direct current of the HVDC transmission or distribution line by introducing a DC voltage in series with the HVDC transmission or distribution line; and
- a protection device for protecting the apparatus against over-current or overvoltage occurrences, the protection device comprising a bypass device connectable to the HVDC transmission or distribution line and connected in parallel with the apparatus, the bypass device being arranged to be in a non-conducting mode, and arranged to be set to a conducting mode, and when in the conducting mode, the bypass device is arranged to conduct direct current of the HVDC transmission or distribution line flowing in a direction on the HVDC transmission or distribution line to electrically bypass the apparatus but flow in the same direction on the HVDC transmission or distribution line,
- wherein the protection device comprises a voltage-dependent nonlinear resistor connected in parallel with the apparatus.

25. The apparatus according to claim 24, wherein the voltage-dependent nonlinear resistor comprises a surge arrester.

* * * * *